United States Patent
Sluder et al.

(10) Patent No.: US 10,605,402 B2
(45) Date of Patent: Mar. 31, 2020

(54) REBAR REINFORCED FOUNDATION SYSTEMS WITH EMBEDDED LEVELING VIALS

(71) Applicants: Don W. Sluder, Lake Jackson, TX (US); R. Scott Sapita, Middlefield, OH (US)

(72) Inventors: Don W. Sluder, Lake Jackson, TX (US); R. Scott Sapita, Middlefield, OH (US)

(73) Assignees: GreenShield Industries, Lake Jackson, TX (US); Basetek LLC, Middlefield, OH (US)

(*) Notice: Subject to any disclaimer, the term of this patent is extended or adjusted under 35 U.S.C. 154(b) by 211 days.

(21) Appl. No.: 15/869,383

(22) Filed: Jan. 12, 2018

(65) Prior Publication Data
US 2018/0202597 A1    Jul. 19, 2018

Related U.S. Application Data

(60) Provisional application No. 62/499,061, filed on Jan. 17, 2017.

(51) Int. Cl.
| | |
|---|---|
| *F16M 7/00* | (2006.01) |
| *F16M 5/00* | (2006.01) |
| *E02D 27/44* | (2006.01) |

(52) U.S. Cl.
CPC .............. *F16M 7/00* (2013.01); *E02D 27/44* (2013.01); *F16M 5/00* (2013.01)

(58) Field of Classification Search
CPC ................... F16M 7/00; F16M 5/00
USPC ...................................... 33/333, 573
See application file for complete search history.

(56) References Cited

U.S. PATENT DOCUMENTS

| | | | | |
|---|---|---|---|---|
| 155,635 | A * | 10/1874 | Brotherton | A47B 91/024 248/188.4 |
| 824,525 | A * | 6/1906 | Bonney | G04B 37/1473 248/188.4 |
| 1,669,380 | A * | 5/1928 | Milburn | B64C 3/00 244/46 |
| 2,102,364 | A | 12/1937 | Langsner | |
| 3,311,990 | A | 4/1967 | Wright | |
| 3,793,738 | A * | 2/1974 | Blakey | G01B 3/00 33/501 |
| 4,005,253 | A | 1/1977 | Walter | |
| 5,165,651 | A | 11/1992 | Welch et al. | |
| 5,240,223 | A | 8/1993 | Welch et al. | |
| 5,398,620 | A * | 3/1995 | Rouch | F16M 7/00 108/1 |
| 5,437,430 | A | 8/1995 | Welch et al. | |
| 5,611,974 | A | 3/1997 | Welch et al. | |
| 5,658,113 | A | 8/1997 | Lazo | |
| 5,749,152 | A | 5/1998 | Goss et al. | |
| 5,753,340 | A | 5/1998 | Welch et al. | |
| 5,791,058 | A * | 8/1998 | Seifert | G01M 5/0008 33/1 H |

(Continued)

FOREIGN PATENT DOCUMENTS

EP        0079887        12/1988

*Primary Examiner* — Christopher W Fulton
(74) *Attorney, Agent, or Firm* — Ira Domnitz; Kelly Stephens

(57) ABSTRACT

A corrosion resistant machine base with a combination of a foundation pedestal with a rebar cage, a mounting surface with foundation bolt holes, leveling vials, and/or integrated drip pans.

14 Claims, 4 Drawing Sheets

(56) References Cited

U.S. PATENT DOCUMENTS

| | | | |
|---|---|---|---|
| 5,972,468 A | 10/1999 | Welch et al. | |
| 6,164,615 A * | 12/2000 | Basham | B28B 1/008 |
| | | | 248/346.01 |
| 6,186,468 B1 * | 2/2001 | Schlegel | F16M 5/00 |
| | | | 248/346.01 |
| 6,243,957 B1 | 6/2001 | Gruetzmacher, Jr. et al. | |
| 6,739,568 B2 * | 5/2004 | Whittaker | B60N 2/0232 |
| | | | 248/562 |
| 6,871,412 B2 * | 3/2005 | Markeson | B23Q 1/0054 |
| | | | 254/89 R |
| 7,086,167 B2 | 8/2006 | Foran | |
| 7,665,250 B2 | 2/2010 | Powell | |
| 7,802,372 B1 * | 9/2010 | Silberberg | G01C 15/008 |
| | | | 33/371 |
| 7,832,113 B1 | 11/2010 | Richins | |
| 8,443,524 B2 | 5/2013 | Kildevaeld | |
| 2006/0192306 A1 | 8/2006 | Giller et al. | |
| 2006/0231971 A1 | 10/2006 | Foran | |
| 2006/0248848 A1 * | 11/2006 | Chappell | B65D 90/24 |
| | | | 52/741.1 |
| 2012/0138768 A1 | 6/2012 | Anderssohn et al. | |
| 2014/0283400 A1 | 9/2014 | Lamont et al. | |
| 2018/0010337 A1 * | 1/2018 | Giarritta | B29D 99/0021 |

* cited by examiner

REBAR REINFORCED FOUNDATION SYSTEMS WITH EMBEDDED LEVELING VIALS

CROSS-REFERENCE TO RELATED APPLICATIONS

This patent application claims priority to U.S. Patent Application 62/499,061 filed on Jan. 17, 2017 and incorporates all content of said application as if set forth in full herein.

STATEMENT REGARDING FEDERALLY SPONSORED RESEARCH

Not applicable.

BACKGROUND

The present invention relates to leveling vials embedded in a rebar reinforced foundation.

The present invention is distinguished from the following art in many ways:

EP 0079887 to Hilsey relates to concrete slab construction. The present invention is distinguished from Hilsey, as Hilsey does not have an embedded level for use in the concrete slab.

U.S. Pat. No. 2,202,364 to Langsner is related to a spirit level with a mounting means. Langsner does not contemplate or disclose the use of a level in a machine slab.

U.S. Pat. No. 3,311,990 to Wright is related to a spirit level with a mounting means. Wright does not contemplate or disclose the use of a level in a machine slab.

U.S. Pat. No. 4,005,253 to Walter is related to a grade-level enclosure for an electrical apparatus. Walter does not contemplate or disclose the use of a level in a concrete machine slab.

U.S. Pat. No. 5,165,651 to Welch et al, discloses a machine foundation. Welch does not teach, contemplate or disclose the use of an embedded level.

U.S. Pat. No. 5,240,223 to Welch et al, disclosed the formation of an aggregate thermoset article with a mold. Welch does not teach, contemplate or disclose the use of an embedded level.

U.S. Pat. No. 5,437,430 to Welch discloses the preparation and repair of a machine foundation. Welch does not teach, contemplate or disclose the use of an embedded level in such formation.

U.S. Pat. No. 5,611,974 to Welch discloses the preparation and repair of a machine foundation. Welch does not teach, contemplate or disclose the use of an embedded level in such formation.

U.S. Pat. No. 5,658,113 to Lazo discloses a building panel device which may utilize a level, but an embedded machine level of the present invention is not taught, contemplated or disclosed.

U.S. Pat. No. 5,749,152 to Goss discloses a spirit level vial construction but does not teach, contemplate or disclose the use of a spirit level embedded into a machine base.

U.S. Pat. No. 5,753,340 to Welch discloses composites and multi-composites but does not teach, contemplate or disclose the use of a spirit level embedded into a machine base.

U.S. Pat. No. 5,972,468 to Welch discloses composites and multi-composites but does not teach, contemplate or disclose the use of a spirit level embedded into a machine base.

U.S. Pat. No. 6,243,957 to Gruetzmacher discloses the insert molding of a level vial. Gruetzmacher does not teach, contemplate, or disclose the use of a spirit level into a machine base.

U.S. Pat. No. 7,086,167 to Foran discloses an over molded vial for use with a level. Foran does not teach, contemplate, or disclose the use of a spirit level into a machine base.

U.S. Pat. No. 7,665,250 to Powell discloses construction of compression blocks. Powell does not teach, contemplate, or disclose the use of a spirit level into a machine base.

U.S. Pat. No. 7,802,372 to Silberberg discloses a removable laser base attachment for bubble levels. Silberberg does not teach, contemplate, or disclose the use of a spirit level into a machine base.

U.S. Pat. No. 8,443,524 to Kildevaeld discloses a multi-purpose utility level. Kildevaeld does not teach, contemplate, or disclose the use of a spirit level into a machine base.

US 2006/0192306 to Giller discloses manufacturing methods for embedded optical systems. Giller does not teach, contemplate, or disclose the use of a spirit level into a machine base.

US 2006/0231971 to Foran discloses a method for forming an over molded vial. Foran does not teach, contemplate, or disclose the use of a spirit level into a machine base.

US 2012/0138768 to Anderssohn discloses a load bearing plate. Anderssohn does not teach, contemplate, or disclose the use of a spirit level into a machine base.

US 2014/0283400 to Lamont discloses a levelling device. Lamont does not teach, contemplate, or disclose the use of a spirit level into a machine base.

SUMMARY

In some embodiments, the present invention is a new and novel design for leveling vials for equipment foundations. In several embodiments, the present invention is designed to minimize environmental and personnel hazards. In several embodiments, the present invention is designed to reduce emissions. In several embodiments the present invention utilizes a foundation system. In several embodiments, the present invention is designed with wire mesh, steel, fiberglass, or carbon fiber rebar embedded no closer than 1.00" from any material surface and constructed in squares and based on Civil Engineering standards. Ranging between 2.00" to 10.00" on center based on structure geometry. In some embodiments the present invention can be built with sides and a top varying in depth, length and widths depending on the equipment configurations and complexity's.

In several embodiments, the leveling vials are located on all four sides of the top surface as close to the center of each edge of the top surface as possible. In several embodiments the vials are to be registered on a flat mounting surface. In several embodiments the vials will contain a white background. In several embodiments, the vials will be cast into metal tooling that is not replicated. In several embodiments all replicated parts are cast with core blocks and the painted vials are calibrated by hand to a top mounting surface.

In several embodiments, the present invention involves a monolithic foundation system combining the equipment mounting surface and traditional concrete pad into one integrated design. In several embodiments the foundation is cast with rugged walls containing internal reinforcements for eliminating common stress cracking. In several embodiments of the present invention precision mounting surfaces along with vials and lasers aid to insure proper installation and speed of installation. In several embodiments, the present invention's vibration dampening characteristics provide longer life for rotating equipment in conjunction with lower foundation maintenance requirements.

In several embodiments, the present invention is a corrosion resistant machine base comprising; a foundation pedestal with a rebar cage; a mounting surface with foundation bolt holes; leveling vials; and integrated drip pans. In several embodiments the present invention is a corrosion resistant machine base comprising; a foundation pedestal with an imbedded rebar cage; a mounting surface with foundation bolt holes attached to the top edge of the foundation pedestal; leveling vials embedded in the top face of the mounting surface; and integrated drip pans embedded into the mounting surface. In several embodiments, the mounting surface further comprises pump and motor inserts embedded in the mounting face as well as guards and covers for the different types of equipment. In several embodiments, the mounting surface further comprises visual indicators. In several embodiments, the mounting surface further comprises threaded leveling inserts. In several embodiments, the foundation pedestal further comprises integral inserts that are constructed of different alloy metals depending on the types of chemicals that they will be exposed to. In several embodiments, the foundation pedestal further comprises grounding lugs that can be located on the sides or top that utilizes a metal embedded threaded insert for attaching the grounding wire. In several embodiments, the foundation pedestal further comprises leveling markers, a leveling bubble, a clear acrylic case, and leveling fluid.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
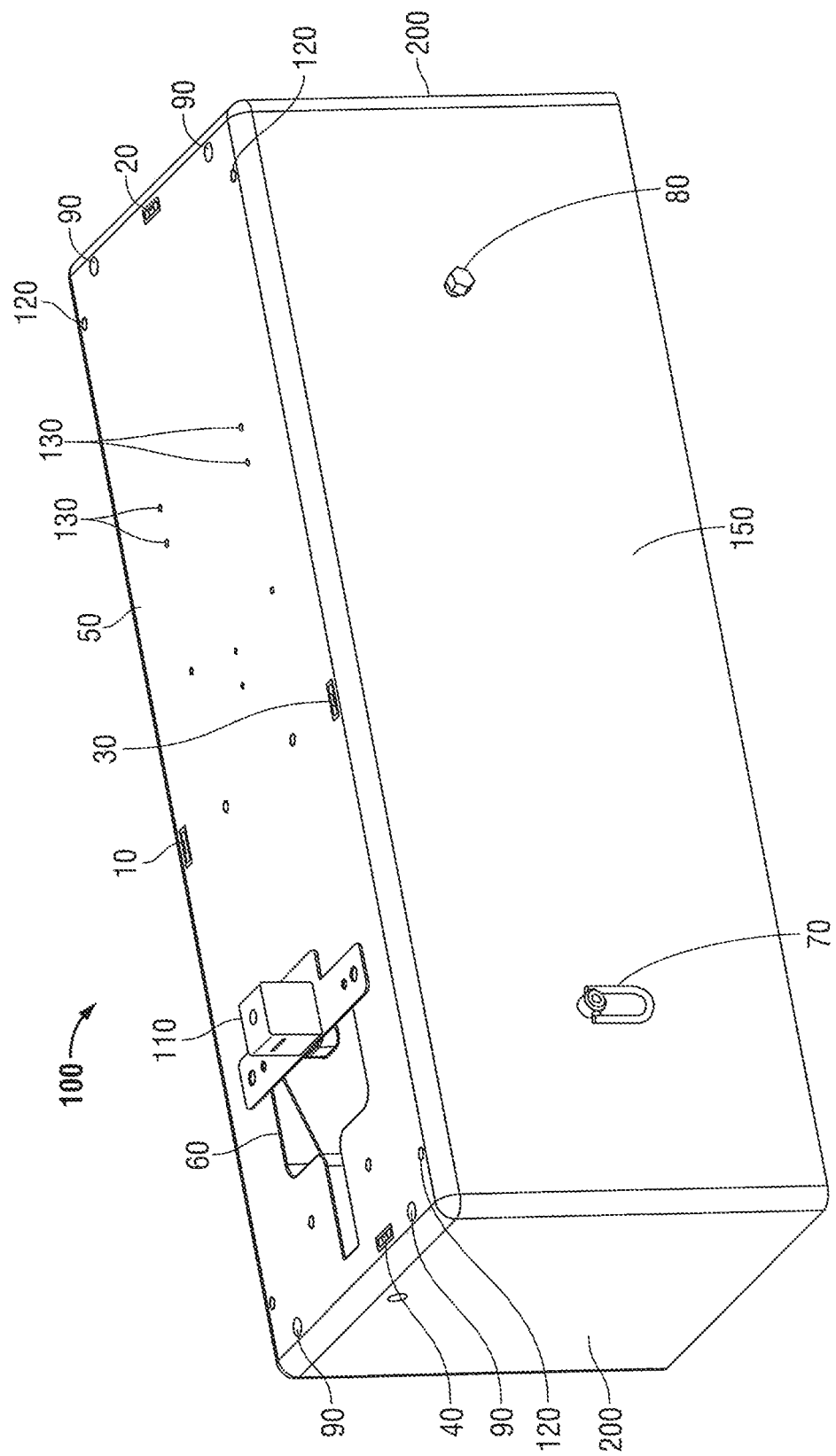
FIG. 1 is a rotated side view of one embodiment of the present invention.

One or more illustrative embodiments incorporating the invention disclosed herein are presented below. Applicant has created a revolutionary and novel machine base with a level embedded in the mounting surface.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it should be understood that the illustrations are for the purpose of describing particular embodiments of the disclosure and are not intended to be limiting thereto. Drawings are not necessarily to scale and arrangements of specific units in the drawings can vary.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 11th Edition, 2008. Definitions and/or interpretations should not be incorporated from other patent applications, patents, or publications, related or not, unless specifically stated in this specification or if the incorporation is necessary for maintaining validity. Specifically defined terms are as follows: As utilized herein, the term "Machine Base", is defined as the combination of the mounting surface, side walls and the foundation pedestal.

Certain terms are used in the following description and claims to refer to particular system components. As one skilled in the art will appreciate, different persons may refer to a component by different names. This document does not intend to distinguish between components that differ in name but not function. The drawing figures are not necessarily to scale. Certain features of the invention may be shown exaggerated in scale or in somewhat schematic form, and some details of conventional elements may not be shown, all in the interest of clarity and conciseness.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

FIG. 1 is a rotated side view of one embodiment of the present invention. As shown, in some embodiments, the present invention is a monolithic foundation system 100 for use in industrial applications. In several embodiments, the foundation system 100 combines the equipment mounting surface 50 and supporting formed foundation pedestal 150 into one single structure 100. Also shown is pedestal sides 200 which form the two sides of the foundation pedestal 150. In several embodiments, the mounting surface 50, the pedestal 150, and two sides 200 are corrosion resistant and are made using thermosets, thermoplastics, cementous, fiberglass reinforced plastics, stone and metal alloys. In several embodiments the mounting surface 50, the pedestal 150, and two sides 200 have a vibration damping design, in several embodiments the damping effect of the harmonics are absorbed into the foundation thru the connection of the equipment to the foundation that can provide increased reliability and considerable time and cost savings over other pieces known in the industry that are made of inferior materials for the environment that they are intended to be used in, for example, concrete and steel are the materials of choice for machine bases, because that is all that is available when constructing a machine base. However, with thermoset resin technology, it is now possible to make the machine base 100 and equipment pads out of a more corrosion resistant material and hence providing a longer life and a more environmentally safe environment.

In several embodiments, the mounting surface 50, the pedestal 150, and the two sides 200 are cast to height, width and length, in a controlled environment utilizing state of the art molding technology. A gel coat is painted onto the prepared mold surface, this will become an integral part of the casting once removed from the mold. When the parts are being made in a manufacturing plant, the mixed thermoset resin with aggregate blends are distributed into the mold. A slight vibration is added to the mold to settle the materials into the mold. Cementous, and fiberglass reinforced plastics are made in the same fashion at a manufacturing plant. Once the materials have hardened, the part can be removed from the mold and made ready for detail work with a high strength internally reinforced polymer concrete and is designed for quick installation for industrial machines at the work site.

Once the machine base 100 is shipped to the work sites, they are installed by trained professionals, which would be comprised of removing the existing foundation or pad by the use of tools for the specific purpose. The machine base 100 is installed usually in the same location as the old base if one was present. Four anchor points are used to hold the new machine base 100 in the location. The bottom connection of the machine base 100 to the substrate is bonded using a thermoset resin and aggregate blended polymer grout. In several embodiments, precision mounting surfaces 50 in conjunction with integral leveling vials 10 [20, 30 and 40 as well] and multiple visual indicators 110 (such as lasers) speed final installation of external equipment to the machine base 100. The laser component can be manufactured by Bosch, however other brands can be used. The laser is mounted onto a bracket that is mounted at the pump end (nearest drip pan 60) of the machine base 100. Once turned on, the laser projects a horizontal line and a vertical line that projects out onto a pipe flange of the existing equipment that was removed. This enables the installer of the new machine base 100 a much more accurate location of the machine base 100 and center line accuracy.

In some embodiments of the present invention, engineered reinforced walls 250 (FIG. 4) eliminate potential stress cracking and the need for additional backfilling for applications under certain operating conditions. However, the need to reinforce the walls and top surfaces of the machine base 100 are an integral part of the machine base 100 due to the number of the inserts and the leveling vials that create stress points within the casting and need the support of the reinforcement to the walls and top of the machine base 100 eliminating the possibilities of stress cracking by way of the use of reinforcement.

In some embodiments, the present invention 100 is foundation system shall be an integrated monolithic structure combining both the equipment mounting surface 50 and traditional concrete elevation pad 150, and sides 200. In some embodiments the equipment mounting surfaces 50 can have a coplanar flatness of 0.002 in/ft. or less. In some embodiments, the internally reinforced (rebar 250) thick walled corrosion resistant polymer concrete of the pad 150, and the sides 200 are designed to withstand applicable environmental stresses, such as thermo cycling, mechanical abuse, chemical exposer.

In several embodiments, the machine base 100 can be provided in final design height within +/−0.1250" (6 mm) of client specifications. In several embodiments of the present invention, no internal back filling of foundation is required for applications under 150 horsepower or for structures with a surface area under 2,000 square inches (5,080 cm).

In several embodiments, internal leveling provisions along with four integrated visual indicators 10, 20, 30 and 40 can be on the mounting surface. In some embodiments of the present invention, grounding lug 80 may be present on either side of foundation 150 towards the motor end with positive connection to both the pump and motor (not shown). In some embodiments, integral inserts 70 are designed as provisions for side lifting lugs are available for some foundations 150. In some embodiments of the present invention, optional items such as integrated drip pans 60, fill/vent ports, motor mounting pads with alignment functions, and laser installation provisions 110 are available.

In several embodiments, an optional fill port to allow grout to back-fill can be attached to the present invention. Top vent holes in tapped thru hole design will be standard with fill port option or grout hole if fill port is not preferred. Vent holes will be located as close to corners as mechanically feasible without obstructing top mounting locations which can be hollow.

In several embodiments, leveling vials 10, 20, 30 and 40 will be located on all four sides of the top surface as close to the center of the side edge as possible. In several embodiments, the vials 10, 20, 30, and 40 are set to be registered to a flat mounting surface. In several embodiments, vials 10, 20, 30, and 40 will contain a white background. In several embodiments, vials 10, 20, 30, and 40 will be cast into metal tooling. In several embodiments of the present invention, all replicated parts must be cast with core blocks and the painted vials calibrated by hand to top mounting surface. In many embodiments, the selection of the location of the vials in reference to a longitude reading for the mounting surface via the four locations is relative only to the installer. The different types of vials distributed by various manufactures, are made specifically for the purpose of the use of leveling. More precision leveling are vials that are filled with petroleum products.

In some embodiments, four threaded inserts 70 will be located on the sides of each of the foundation 150 to be used as lift points. In some embodiments, the inserts 70 are designed to accept a customer supplied lug to facilitate a safe lift/transport. In several embodiments, the present invention can contain foundation bolt holes 90 utilized to secure a machine base 100. In several embodiments, the standard for the machine base 100 is at four locations on the corners of the machine base 100, are 1" holes that are installed in the molding process and cast smooth. It enables a professional installer the ability to insert a drill bit to the depth of the foundation and drill into the substrate for setting a mechanical anchoring system for the machine base 100. In several embodiments of the present invention, there are threaded leveling inserts 120 embedded in the mounting surface 50 utilized to assist a user with expedited and accurate leveling. The inserts are placed at 2 or 3 locations down each long side of the machine base 100. In several embodiments, the present invention has pump and motor inserts 130 that are preferably designed to be corrosion resistant and durable. In several embodiments, the inserts are made out of Alloy Stainless Steel, or Carbon Steel.

Figure 2:
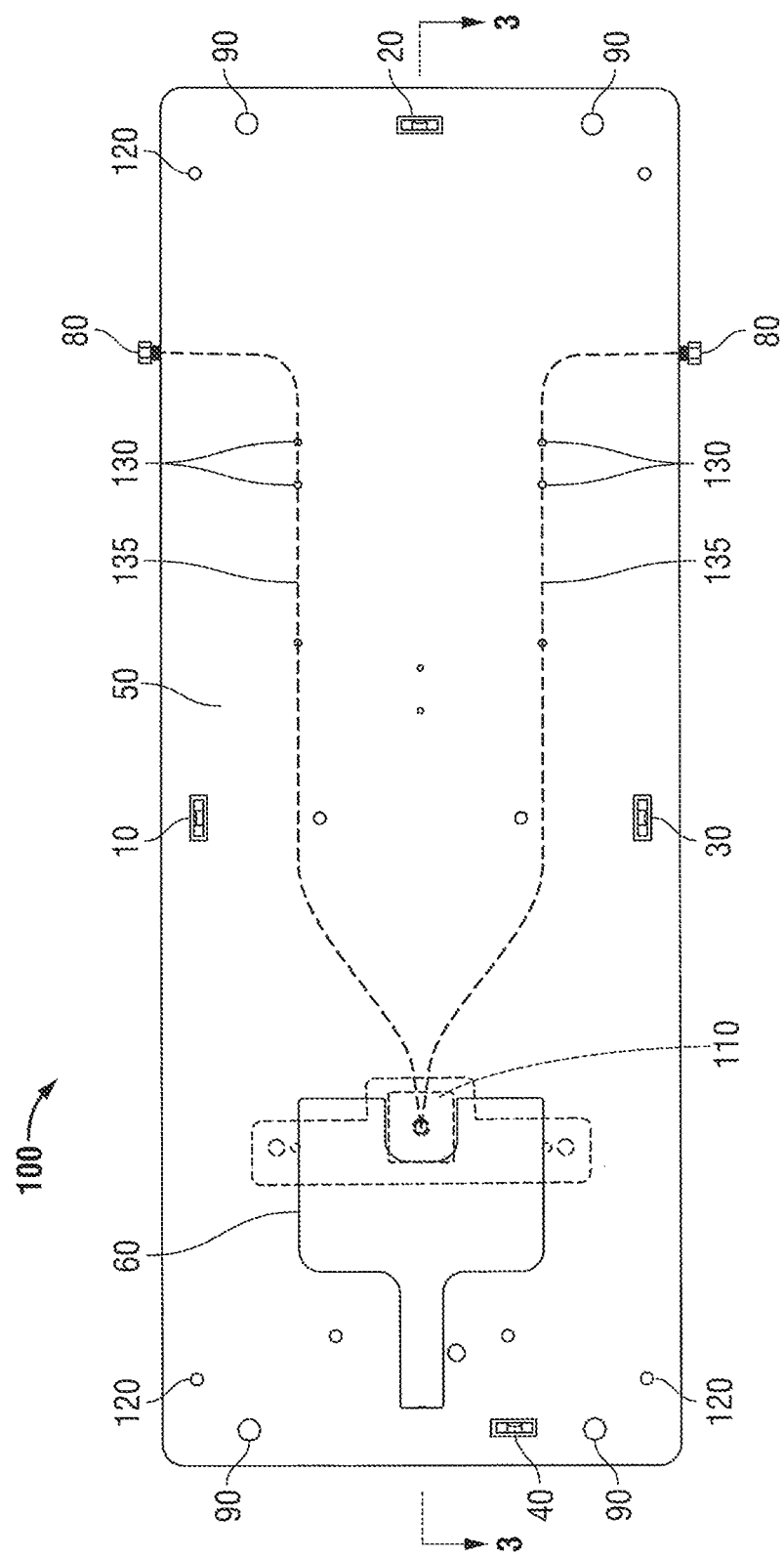
FIG. 2 is the top view of one embodiment of the present invention.
Figure 3:
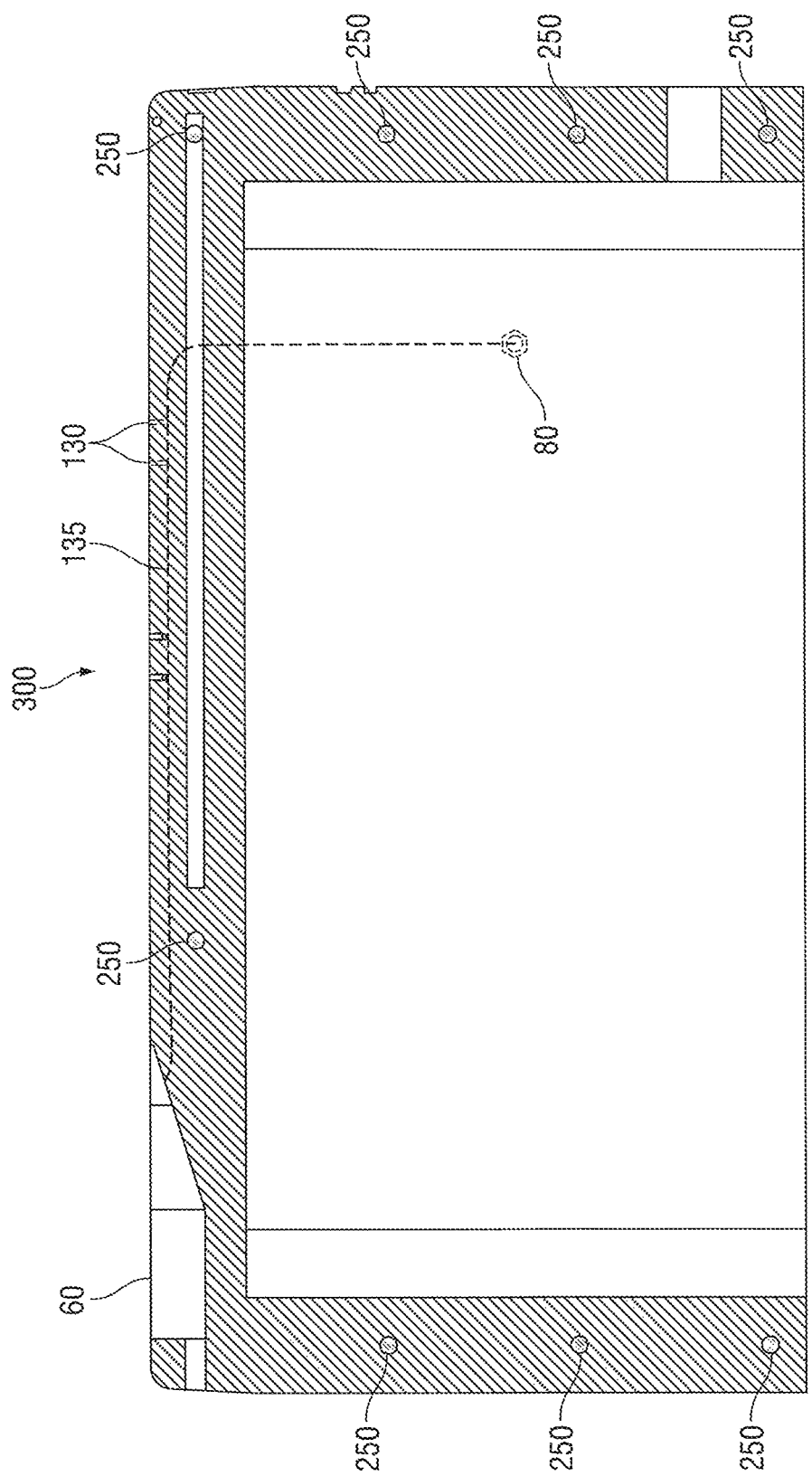
FIG. 3 is a partial cross section view of the present invention.

FIG. 2 is top view of one embodiment of the present invention. In several embodiments, precision mounting surfaces 50 in conjunction with integral leveling vials 10 and multiple visual indicators 110 (such as lasers) speed final installation. In many embodiments, each metal insert in FIG. 2 as shown, are connected via a wire grid that is connected to the grounding insert on the side 80, FIG. 1. This is done at the time of the insert installation into the mold prior to the casting of the machine base 100. Further shown in FIGS. 2 and 3 are grounding wires 135 which can be utilized to ground electronic devices that are attached to the mounting surface 50.

In some embodiments, the present invention 100 is machine base 100 and shall be an integrated monolithic structure combining both the equipment mounting surface 50 and foundation pedestal 150. In some embodiments the equipment mounting surfaces 50 can have a coplanar flatness of 0.002 in/ft. or less.

In several embodiments, internal leveling provisions along with four integrated visual indicators 10, 20, 30 and 40 can be on the mounting surface. In some embodiments of the present invention, optional items such as integrated drip pans 60, fill/vent ports, motor mounting pads with alignment functions, and laser installation provisions 110 are available.

In several embodiments, an optional fill port to allow grout to back-fill can be attached to the present invention. Top vent holes in tapped thru hole design will be standard with fill port option or grout hole if fill port is not preferred. Vent holes will be located as close to the corners as mechanically feasible without obstructing top mounting locations. In several embodiments, this location is at the motor end of the machine base 100. It is located at the bottom of the Machine Foundation and is 1.5" to 2" sizes.

In several embodiments, leveling vials 10, 20, 30 and 40 will be located on all four sides of the top surface as close to the center of the side edge of each side of the top surface as possible. In several embodiments, the vials 10, 20, 30, and 40 are set to be registered to a flat mounting surface. In several embodiments, vials 10, 20, 30, and 40 will contain a white background. In several embodiments, vials 10, 20, 30, and 40 will be cast into metal tooling. In several embodiments of the present invention, all replicated parts must be cast with core blocks and the painted vials calibrated by hand to top mounting surface.

In several embodiments, the present invention can contain foundation bolt holes 90 utilized to secure a foundation. In several embodiments of the present invention, there are threaded leveling inserts 120 embedded in the mounting surface 50 utilized to assist a user with expedited and accurate leveling. In several embodiments, the present invention has pump and motor inserts 130 that are preferably designed to be corrosion resistant and durable.

FIG. 3 is a partial cross section view of the present invention. As shown in FIG. 3 cross sections of rebar 250. Also shown is integrated drip pans 60.

Figure 4:
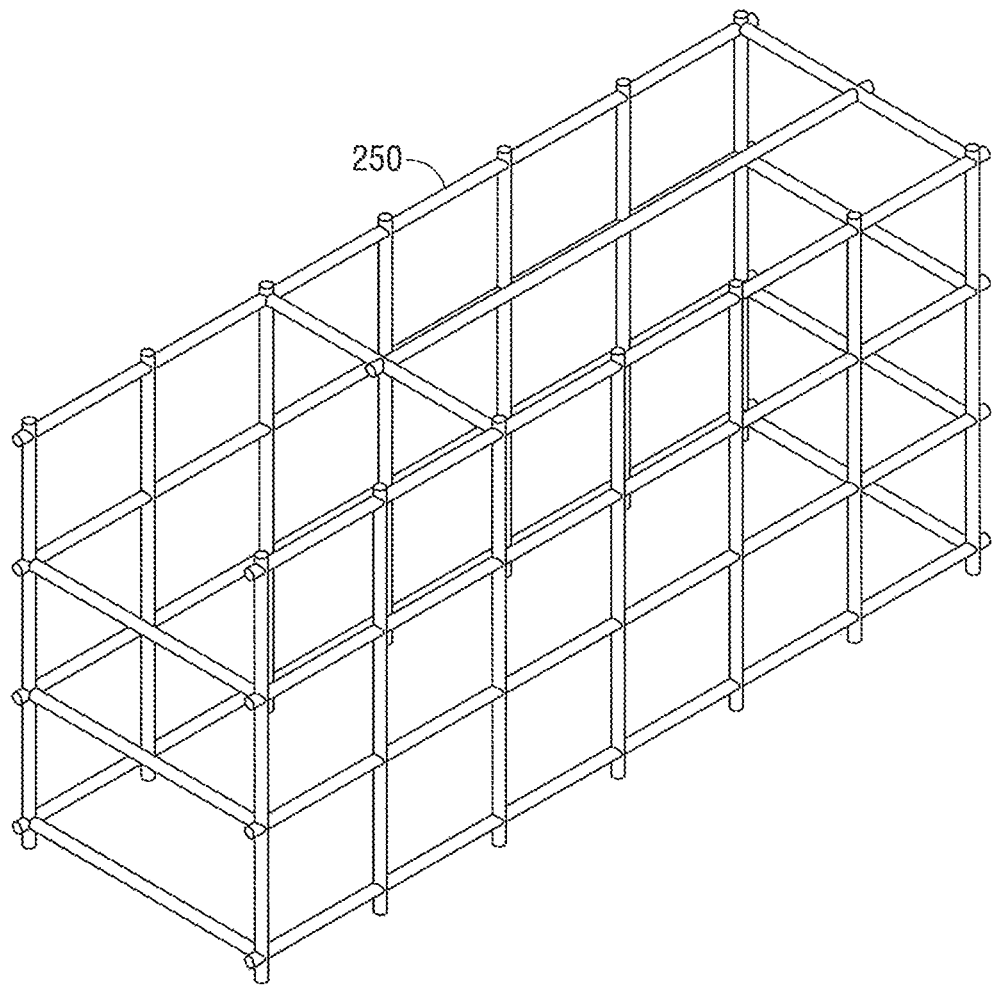
FIG. 4 is a partial side view of the rebar framework of one embodiment of the present invention.

FIG. 4 is a partial side view of the rebar framework of one embodiment of the present invention. FIG. 4 illustrates one embodiment of the rebar cage 250 that is part of the support for foundation pedestal 150 and sides 200.

Figure 5:
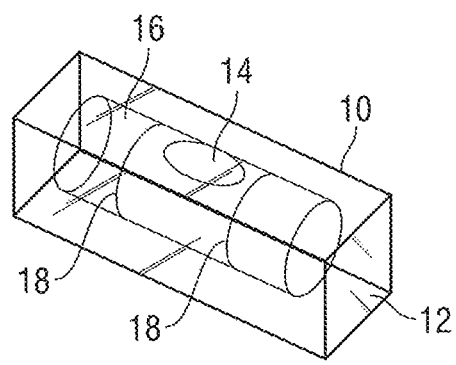
FIG. 5 is a partial side view of the level vial of one embodiment of the present invention.

FIG. 5 a partial side view of the level vial of one embodiment of the present invention. As shown, leveling vials 10 are preferably comprised with leveling markers 18 and leveling bubble 14 in a clear acrylic case 12. Also shown is leveling fluid 16.

While preferred embodiments have been shown and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. Accordingly, it is intended that the following claims be interpreted to embrace all such variations and modifications.

We claim:

1. A corrosion resistant machine base with a gel coat comprising;
    a nonbackfilled foundation pedestal with a rebar cage which is reinforced in casting;
    a mounting surface with foundation bolt holes and threaded leveling inserts and a grounding wire;
    leveling vials; and
    integrated drip pans.
2. The mounting surface of claim 1 further comprising; pump and motor inserts.
3. The mounting surface of claim 1 further comprising; visual indicators.
4. The foundation pedestal of claim 1 further comprising; integral inserts.
5. The foundation pedestal of claim 1 further comprising; grounding lugs.
6. The leveling vial of claim 1 further comprising; leveling markers, a leveling bubble, a clear acrylic case, and leveling, fluid.
7. The mounting surface of claim 1 further comprising; lift points.
8. A corrosion resistant machine base with a gel coat comprising;
    a non-backfilled foundation pedestal with an imbedded rebar cage which is reinforced in casting;
    a mounting surface with foundation bolt holes attached to the top edge of the foundation pedestal;
        said mounting surface further comprising threaded leveling inserts and a grounding wire;
    leveling vials embedded in the top face of the mounting surface; and
    integrated drip pans embedded into the mounting surface.
9. The mounting surface of claim 8 further comprising; pump and motor inserts.
10. The mounting surface of claim 8 further comprising; visual indicators.
11. The mounting surface of claim 8 further comprising; integral inserts.
12. The mounting surface of claim 8 further comprising; grounding lugs.
13. The leveling vial of claim 8 further comprising; leveling markers, a leveling bubble, a clear acrylic case, and leveling fluid.
14. The mounting surface of claim 8 further comprising; lift points.

* * * * *